UNITED STATES PATENT OFFICE.

EDWARD C. GATLIN, OF KANSAS CITY, MISSOURI.

PAINT-OIL COMPOUND.

1,011,611.  Specification of Letters Patent.  Patented Dec. 12, 1911.

No Drawing.  Application filed August 2, 1911. Serial No. 641,990.

*To all whom it may concern:*

Be it known that I, EDWARD C. GATLIN, a citizen of the United States, residing at Kansas City, in the county of Jackson and State of Missouri, have invented certain new and useful Improvements in Paint-Oil Compounds; and I do hereby declare the following to be a full, clear, and exact description of the invention, such as will enable others skilled in the art to which it appertains to make and use the same.

My invention relates to new and useful improvements in a compound for oil and my object is to provide an oil which may be substituted for the well known linseed oil. In accomplishing this result, I employ the following ingredients: Clear rosin 500 lbs., calcine or carbonate of calcium 20 lbs., plumbi subacetas 25 lbs., refined fish oil 375 lbs., china wood oil 750 lbs., oil of myrbane 1 oz. to each gallon of finished product, deodorized coal oil 200 gals., refined naphtha 225 gals., raw linseed oil or soybean oil 2%.

In preparing and commingling the above ingredients, a high grade of clear rosin is placed in any suitable vat or kettle and slowly and gradually heated. The carbonate of calcium is likewise placed in a solution of water sufficient to thoroughly dissolve the same and when the rosin has reached a predetermined temperature, this latter solution is placed therein and the temperature gradually increased to a predetermined point, this temperature being held until all the water which was originally incorporated with the lime has passed off as steam. The heat is then gradually increased to a still higher temperature when the plumbi subacitatis (sugar of lead) is added and the heat again increased to a still higher predetermined degree. The product thus produced is then removed from the vat and allowed to cool to a degree where it will pour easily, although should the solution become solidified, it can still be successfully used with the balance of the ingredients. In the second step, I employ approximately 375 lbs. of especially refined fish oil preferably menhaden fish oil and add to this 750 lbs. of china wood oil, these two ingredients being then brought to a predetermined degree of heat and the first mixture of resinous substance added thereto, approximately the same degree of heat being then held for thirty minutes, more or less. This preparation is then allowed to gradually cool to a predetermined degree when oil of myrbane to the amount of 1 ounce for each gallon of the finished product is added. The temperature of the product thus produced is still further lowered when 200 gallons of refined deodorized coal oil is added thereto and when the temperature is still further lowered, 225 gallons of refined naphtha are added, the solution being constantly stirred from the time the resinuous substance is added until the product is properly cooled. After the mixture has been reduced to a low degree of heat, 2% of raw oil, such as linseed, soybean, or similar oils, singly or commingled, is added thereto, thus producing a mixture that will be lighter in color than the linseed oil and one that will wear longer. This mixture can also be more readily and easily applied with a brush than the linseed oil and can be produced at a much less cost.

The prime object of this invention, among others is to produce an oil which when applied with pigments or paint on wood, iron or other surfaces, practically forms a cement with the pigment or paint, thus holding the same more securely to the surface over which it is applied.

What I claim is:

An oil compound comprising rosin, carbonate of calcium, sugar of lead, fish oil, oil of myrbane, coal oil, naphtha and raw oil in the proportions specified and prepared and commingled as set forth.

In testimony whereof I have signed my name to this specification in the presence of two subscribing witnesses.

EDWARD C. GATLIN.

Witnesses:
C. A. STINSON,
J. B. NALL.